Figure 1:
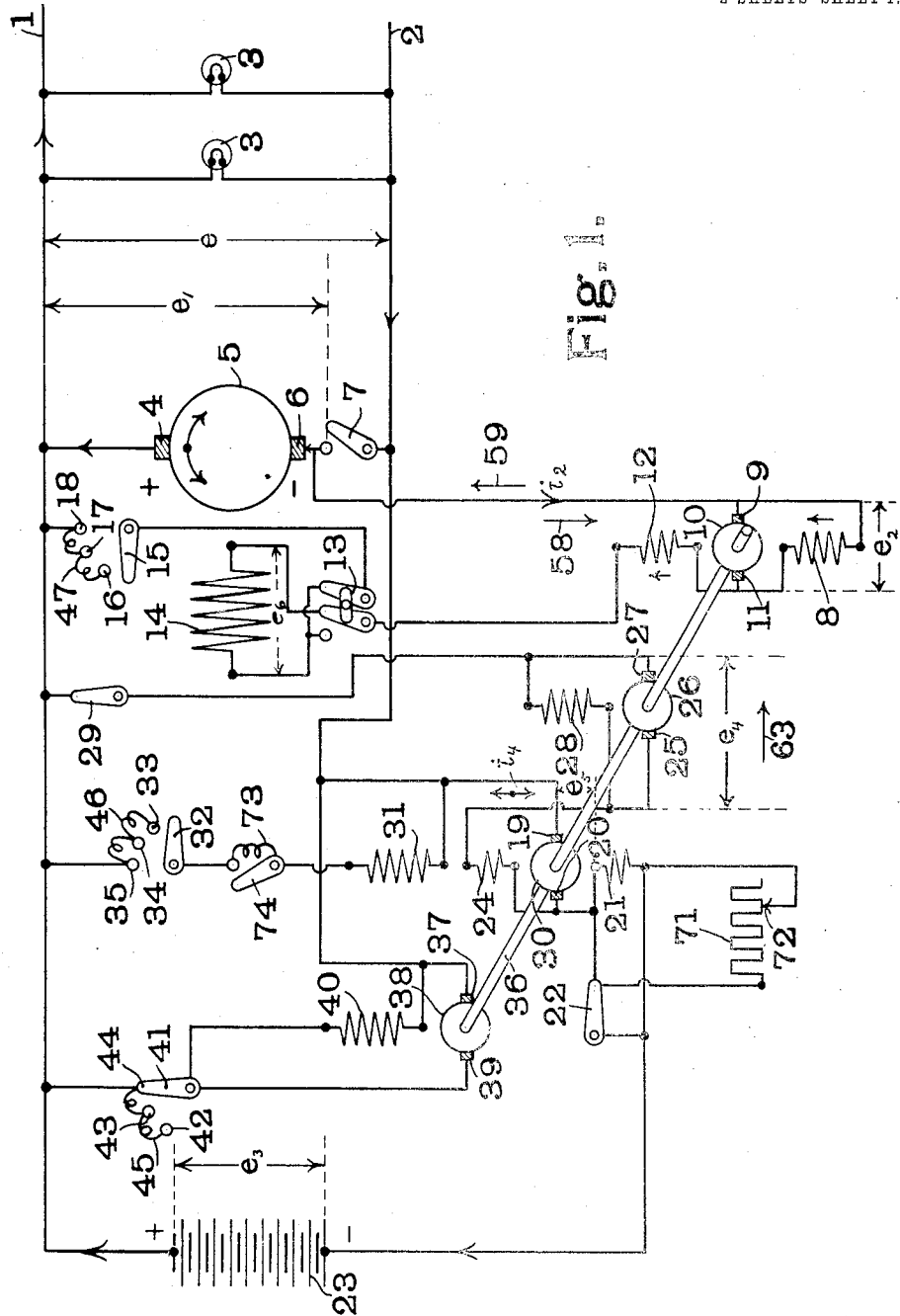

V. A. FYNN.
SYSTEM OF ELECTRICAL DISTRIBUTION.
APPLICATION FILED MAR. 16, 1910.

1,084,078.

Patented Jan. 13, 1914.

2 SHEETS—SHEET 1.

WITNESSES:
L. L. Mead.
W. H. Alexander

INVENTOR
Valère A. Fynn,
BY
Fowler & Huffman
ATTORNEYS

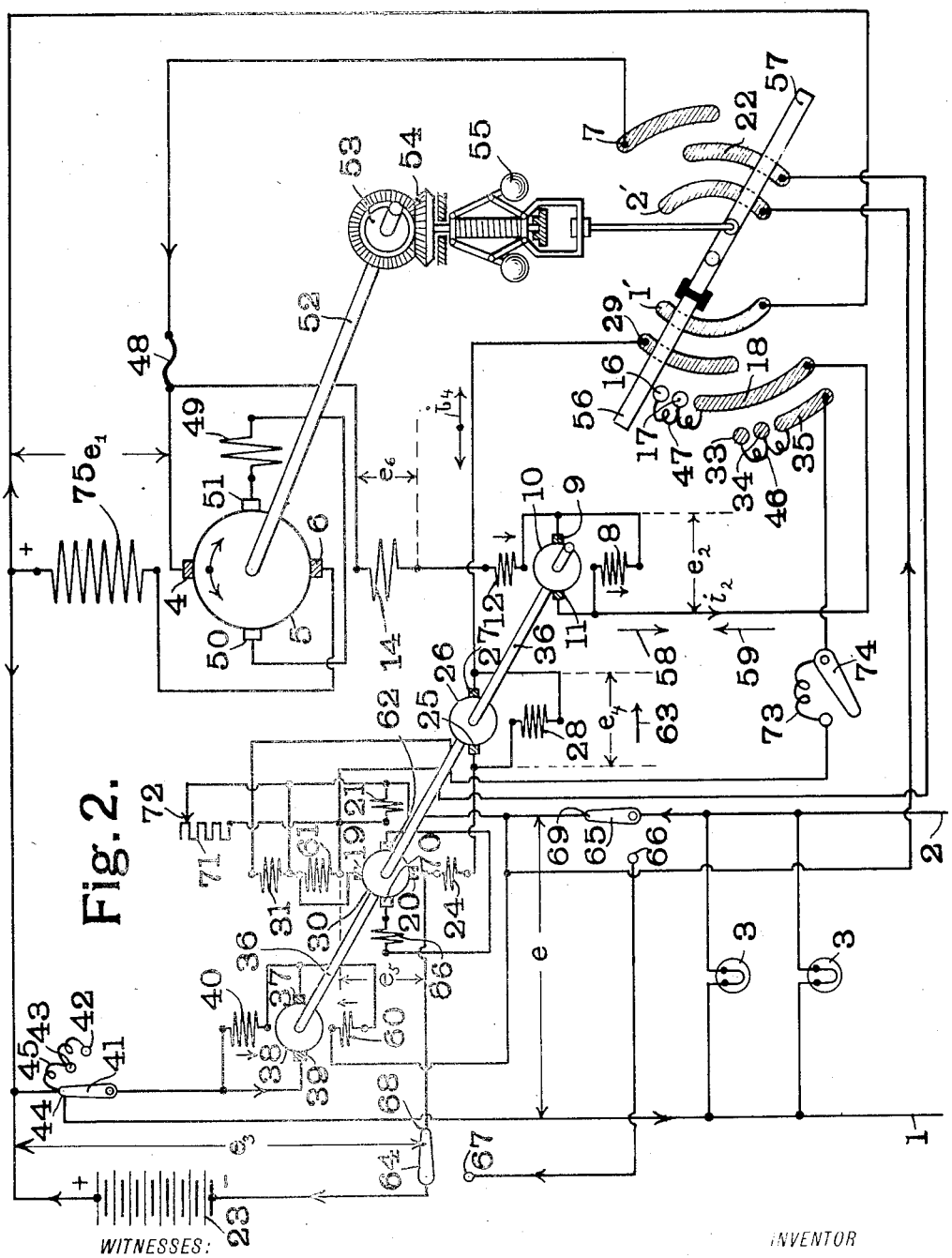

UNITED STATES PATENT OFFICE.

VALÈRE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

SYSTEM OF ELECTRICAL DISTRIBUTION.

1,084,078.　　　　　　Specification of Letters Patent.　　　Patented Jan. 13, 1914.

Application filed March 16, 1910.　Serial No. 549,639.

*To all whom it may concern:*

Be it known that I, VALÈRE ALFRED FYNN, a subject of the King of England, residing at London, England, have invented a certain new and useful System of Electrical Distribution, of which the following is such a full, clear, and exact description as will enable any one skilled in the art to which it appertains to make and use the same, reference being had to the accompanying drawings, forming part of this specification.

My invention relates to a system of electric light and power distribution and apparatus therefor, in which a generator that may be driven at varying and irregular speeds, and hereinafter referred to as a " variable speed dynamo," is associated with a storage battery, the latter feeding the consumption circuit when the generator is at rest or is being driven at too slow a speed, *i. e.*, at a speed below its critical speed.

The improved system is particularly well adapted for car lighting, for windmill operated plants and the like.

The objects of this invention are to feed the consumption circuit at a practically constant voltage, whether supplied from the battery or the generator, or from both; to make adequate provision for charging the storage battery from the generator; to avoid as far as possible all fluctuations of the voltage impressed on the consumption circuit, when making the necessary alterations to the connections between the various elements of the system, at or about the time when the main generator reaches the critical speed, and is connected to the consumption circuit; to reduce the necessary alterations of connections to a minimum and to avoid, as far as possible, the use of delicate automatic devices.

Other objects and advantages of my improved system will appear from the detailed description, and from the accompanying drawings, in which—

Figure 1 represents one form of my system, and Fig. 2 shows another form of said system, together with an improved form of dynamo electric machine, and an automatic, centrifugally controlled switch.

In its preferred form my system comprises a consumption circuit and a storage battery connected thereto, a main dynamo provided with a primary and a secondary exciting winding and adapted to be connected to the consumption circuit in parallel to the battery after said main dynamo has reached a sufficient speed, or after its voltage has reached a predetermined value; an auxiliary dynamo preferably driven by a motor supplied with current from the consumption circuit, the auxiliary dynamo being connected in local circuit with said main dynamo through the primary exciting winding, and being adapted to generate an E. M. F. in excess of and opposing that generated by the main dynamo; means for controlling the circuit of the primary exciting winding; a booster driven by the motor and connected in circuit between the main dynamo and the storage battery; means for regulating the magnitude and direction of the E. M. F. generated by the booster while the storage battery is discharging; means for altering the connections of the booster, after the main dynamo has been connected to the consumption circuit, so as to add the voltage generated by the booster to that generated by the main dynamo; and means for decreasing the booster voltage as the charging current sent into the storage battery increases.

In Fig. 1, the storage battery 23 is permanently connected to the consumption circuit 1, 2 with the translating devices such as 3. One pole of the battery is directly connected to said circuit, and the other is connected to it through the booster 30. One pole of the main dynamo 5 is also permanently connected to the consumption circuit, while the other pole can be connected to said circuit at the proper time by means of the switch 7. The voltage of the main dynamo is determined and regulated by means of the auxiliary dynamo electric machine 10 included in the circuit of the primary exciting winding 14 of the main dynamo. The booster 30, the auxiliary dynamo, 10, and the discharge regulating dynamo 26 are driven by the motor 38 connected across the mains 1, 2. The booster 30 is adapted to operate as a reversible booster, *i. e.* as a booster or as a crusher. When the storage battery alone feeds the consumption circuit, the direction and magnitude of the voltage of this reversible booster is regulated by the discharge regulating dynamo 26 in conjunction with the storage battery. This machine 30 is also adapted to operate as a charging booster when the main dynamo is connected to the mains.

The various switches are shown in the positions they should occupy when the main dynamo 5 is at rest. The positive pole of the storage battery 23 is directly connected to main 1, while the negative pole is connected to main 2 by way of the booster 30, which is now so connected as to act as a reversible booster for the purpose of regulating the discharge of the storage battery. To this end the series field winding 21 is short-circuited at 22 and the primary exciting winding 31 is disconnected, but the discharge regulating winding 24 is connected to the negative pole of the storage battery near switch 22, and to the positive pole by way of the discharge regulating dynamo 26 and the switch 29. This dynamo 26, as well as the booster 30, is driven by the shunt motor 38 by means of the shaft 36. The motor is connected across the mains and controlled by switch 41. It is adapted to run at a practically constant speed. The dynamo 26 generates a constant E. M. F. $e_4$ and is so connected as to oppose the E. M. F. $e_3$ which is available at the terminals of the storage battery and which varies with the condition of the battery and with the current taken from it. If $e_4$ is greater than $e_3$, which will be the case when the battery has been discharging for some time or when it is supplying an abnormally large current, then $e_4$ will determine the direction of the exciting current $i_4$ through 24. The discharge regulating winding 24 is so connected that $e_5$ which is generated by 30 is added to $e_3$ when $e_4$ is larger than $e_3$, thus keeping the E. M. F. ($e$) impressed on the mains 1, 2 constant and higher than $e_3$. Both 30 and 26 act as generators when $e_4$ is larger than $e_3$, and must be driven by 38. If $e_3$ is greater than $e_4$ then the direction of the current $i_4$ in the winding 24 is reversed thereby automatically reversing the direction of $e_5$. The booster 30 now crushes $e_3$, thus still maintaining $e$ constant, and acts as a motor driving 38 while 26 also acts as motor and also drives 38 thus returning the crushed energy to the mains at the proper voltage.

Soon after the main dynamo begins to rotate its primary exciting circuit can be closed but this is preferably done through a resistance so as not to throw an excess of load on the regulating dynamo 10. This exciting circuit must not be closed until the regulating dynamo is running and is excited. The exciting circuit of 5 can be traced from its primary exciting winding 14 to the reversing switch 13, the compounding winding 12 of the auxiliary dynamo 10, the brush 11, the commuted winding 10, the brushes 9 and 6, the commuted winding 5, brush 4, resistance 47 and back to 14 by way of switch 15. The E. M. F. $e_2$ generated by the auxiliary dynamo 10, provided with the shunt winding 8, not only opposes the E. M. F. $e_1$ generated by 5 as indicated by the arrows 58 and 59 respectively, but is always larger than $e_1$. $e_1$ is practically zero just before switch 15 is closed and $e_2$ therefore determines the direction of the exciting current $i_2$. The reversing switch 13 is so placed that for the direction in which 5 is driven $e_1$ will be opposed to $e_2$ and will thus diminish $i_2$ with rising speed. As the speed increases more of the resistance 47 is cut out and when the main dynamo has reached its critical speed the whole of 47 is cut out. After this $e_1$ will always be equal to $e_2-e_6$ where $e_6$ represents the ohmic drop in the primary exciting winding 14. It is essential that $e_2$ be larger than $e_1$ for it is only under such conditions that a true constant voltage dynamo can be built which will deliver a constant pressure irrespective of the load and of the speed of rotation. If $e_2$ is larger than $e_1$ then the E. M. F. $e_1$ which is generated by the main dynamo, will always tend to equal $e_2$ because the greater the excess of $e_2$ over $e_1$ the greater will be the exciting current flowing through 14 and therefore the higher will $e_1$ tend to rise. The maximum possible variation of $e_1$ will be equal to that E. M. F. which is necessary to fully excite the main dynamo at the lowest speed for which the machine is designed. It will never be possible for $e_1$ to become greater than $e_2$ because $e_1$ must necessarily become equal to $e_2$ before it can exceed $e_2$ and it will be obvious that $e_1$ can never reach that value for the reason that the exciting current of the main dynamo would then become zero making $e_1$ also zero. Whatever the speed or the load, $e_1$ always tends to equal $e_2$ but can never actually do so. No such condition could be secured if $e_2$ were chosen smaller than $e_1$. Proposals have been made for regulating the main dynamo by inserting into the exciting circuit an auxiliary and variable E. M. F. and causing this auxiliary E. M. F. to increase with increasing load on the main dynamo. Such an auxiliary E. M. F. must be zero at no-load and must rise with increasing load. Not only can the polarity of such machines be reversed but they only deliver approximately constant voltage and do so only under load or when connected in parallel to a storage battery. By choosing $e_2$ greater than $e_1$ I obtain a main dynamo, the polarity of which cannot be reversed and which will give practically constant voltage at any working speed irrespective of its output in amperes. If $e_2$ is made variable then the ohmic resistance of 14 can be chosen relatively large and the size of the auxiliary dynamo 10 can thus be reduced while keeping $e_1$ quite constant. Suppose a certain dynamo generating about 30 volts to require 1 volt and 10 amperes through its exciting winding, say at the lowest speed for which it is designed. This dynamo will need an auxiliary dynamo 10 having an output of 31 volts and 10 amperes. If the turns in the exciting circuit be now doubled, this main dynamo will require a maximum excitation of 2 volts and 5 amperes necessitating an auxiliary dynamo with an output of only 32 volts and 5 amperes. In the first case the maximum variation of the voltage at the terminals of the main dynamo will be 1 volt with a 310 watt auxiliary dynamo. In the second case this maximum variation will be 2 volts with a 160 watt auxiliary dynamo. If the voltage of the auxiliary 160 watt dynamo is made to vary from 32 volts when five amperes flow through the exciting winding 14 of the main dynamo, down to 30 volts, when this current has fallen to say, .01 amperes, then the voltage of the main dynamo will not vary by more than .01 volts between any two speeds. A more constant main voltage is thus secured notwithstanding the fact that the size of the auxiliary dynamo has been reduced from 310 to 160 watts. In this case $e_2$ is made to increase with increasing $i_2$ by compounding the dynamo 10. The main dynamo 5 can be paralleled with the storage battery at the critical or at any higher speed and this can be done without shock to the system provided $e_2$ and $e_4$ have been so chosen that $e$ and $e_1$ always remain of practically equal magnitude.

The main dynamo is connected to the consumption circuit by closing switch 7. The next operation is to convert the booster 30 from a reversible booster into a charging booster with a drooping characteristic. To this end switch 32 is placed on point 33, thus overpowering the discharge regulating winding 24 by means of the shunt exciting winding 31 and making $e_5$ of same direction as $e_1$. Switch 29 can now be opened and switch 32 moved to point 34. When switch 22 is opened and switch 32 placed on point 35 then the booster 30 will assume a drooping characteristic due to the series demagnetizing winding 21 and will be fully excited by the shunt winding 31. The main dynamo can now directly supply the consumption circuit and charge the storage battery at the same time with the help of the charging booster 30 while its E. M. F. is being kept constant by the auxiliary dynamo 10. The motor 38 must of course drive the auxiliary dynamo 10 and the booster 30. The resistances which are provided are only in use for a very short time and they are all inserted in exciting circuits. The losses they can occasion, if left in for any length of time, must therefore be extremely small. All disturbing fluctuations of $e$ are avoided and the highest efficiency is preserved at all stages of the switching operations. If it is desired occasionally to overcharge the battery then switch 74 can be closed thus shortcircuiting the small resistance 73 and raising the charging voltage. The maximum charging current can be adjusted by means of the resistance 71 connected in parallel with the series winding 21. If it be not desired to regulate the discharge of the battery, then the discharge regulating dynamo 26 can be left out, and the connections correspondingly simplified.

In Fig. 2 is shown the preferred form of the elements and connections of my system of distribution in which the main dynamo and the booster have a primary exciting or teaser winding and a secondary, locally closed, exciting winding. This type of dynamo makes it possible to greatly reduce the size of the auxiliary and of the discharge regulating dynamos. It has the further advantage of permitting an E. M. F. of same direction to be obtained irrespective of the direction of rotation and without reversing the connections of the exciting circuits by shifting the brushes or otherwise. Fig. 2 also shows a centrifugally controlled main switch with levers 56, 57 in place of the various independent switches shown in Fig. 1. The centrifugal device 55 controlling this switch is driven from the main dynamo by way of example through the shaft 52 and the miter wheels 53, 54. The position in which this switch is shown corresponds to zero revolutions of the main dynamo. It is seen that for this position of the main switch the positive pole of the storage battery is directly connected to main 1 while the negative pole is connected to main 2 by way of the emergency switch 64, working brush 20, commuted winding 30, working brush 19 and neutralizing winding 61 of the booster, thence by way of contact 22, lever 57, contact 2' of the main switch, and the emergency switch 65 to main 2. The booster 30 together with the discharge regulating dynamo 26 and the auxiliary dynamo 10 are driven by the motor 38 by means of the shaft 36. The motor has a shunt winding 40 and a series winding 60. The latter either keeps the speed of the motor constant or causes the same to vary according to the direction in which it is connected and according to the number of its turns. The motor is connected to main 2 near switch 65 and to main 1 by way of the starting switch 41. The secondary exciting circuit of the booster comprises the commuted winding 30 locally closed on the stator winding 86 by way of the exciting brushes 62 and 70. The discharge regulating winding 24 of this booster is connected on one side to the negative pole of the storage battery through switch 64 and on the other side to the negative brush 25 of the discharge regulating dynamo 26 provided with the shunt winding 28. The positive brush 27 of this dynamo is connected to the positive pole of the storage battery by way of contact 29, lever 56 and contact 1' of the main switch. All the other circuits except the secondary exciting circuit of the main dynamo, the shunt winding 8 of the auxiliary dynamo, and the short circuited winding 21 of the booster are open. In this position of the main switch the booster keeps the E. M. F. ($e$) impressed on the consumption circuit, constant by either adding to or subtracting from the E. M. F. $e_3$ of the storage battery according to whether the E. M. F. $e_4$ generated by the discharge regulating dynamo 26 is larger or smaller than $e_3$.

When the main dynamo is driven in either direction, the weights 55 fly out and move the lever of the main switch. When a sufficient speed has been reached, lever 56 comes into contact with point 16 thus closing the local circuit which can be traced through the neutralizing winding 75, the working brush 6, the commuted winding 5, the working brush 4 and the primary exciting or teaser winding 14 of the main dynamo, to the compound winding 12 of the auxiliary dynamo, to its brush 9, its commuted winding 10, and its brush 11, thence to contact 18 resistance 47, contact 16, lever 56 and contact 1' of the main switch and back to the positive pole of the main dynamo which thus becomes excited. With increasing speed the resistance 47 is entirely cut out and when lever 57 reaches contact 7 then the main dynamo is directly connected to the consumption circuit through the fuse 48. At a still higher speed lever 56 comes into contact with point 33 connecting the primary exciting winding 31 of the booster in parallel to the mains through the resistance 46. Part of this resistance is cut out when the lever 56 reaches point 34 and at the same time the discharge regulating circuit is broken at 29. When lever 57 leaves contact 22 the shunt shortcircuiting the demagnetizing series winding 21 of the booster is opened and when lever 56 stands on contact 35 all the resistance 46 is cut out of the circuit of 31. In this position of the main switch the main dynamo supplies the consumption circuit at a constant potential and charges the battery with the help of the booster, the voltage of the latter increasing with decreasing charging current owing to the demagnetizing series winding 21. The foregoing operations are automatically carried out in reversed order as the speed diminishes. Where the lights are not required for ordinary service and the main dynamo is not likely to be driven, then switch 41 can be opened thus stopping the motor. The emergency switches 64, 65 should then be placed on points 67 and 66 respectively. Lights can thus be supplied direct from the storage battery, but no current can flow into any of the machines.

A numerical example will serve to make the advantages of the system clear. Assume in Fig. 2 a maximum output of 3000 watts at 31 volts for the main dynamo 5, 300 watts will then be required in its shortcircuited exciting circuit 50, 5, 51, 49 and consequently only about 50 watts in its teaser winding 14. If the maximum ohmic drop $e_6$ across the terminals of 14 is chosen at 10 volts, then $e_2$ must be made to vary between 41 and 31 volts and must deliver a maximum of 5 amperes. The maximum output of the auxiliary dynamo 10 is therefore 205 watts requiring an input of 345 watts if an efficiency of 60% be assumed for this separately excited machine. This size of the booster 30 is determined by the maximum volts, and the maximum current required from same. This booster must generate its maximum voltage when charging its storage battery, and must handle its largest current when regulating the discharge of the battery. The maximum voltage required to be generated by 30 for charging 16 cells is 12 volts. The maximum discharge current of the storage battery is 50 amperes. When regulating the discharge of the storage battery to 31 volts $e_4$ must be made 31 volts, because the maximum voltage of the battery is about 35.2 volts. The maximum output of the booster 30 must be (4.2 volts×50 amperes) 210 watts requiring an input of 467 watts at 45% efficiency for this self-excited booster. Owing to its dropping characteristic the maximum output of the booster 30 when doing duty as a charging booster will be about 160 watts with an efficiency of about 40% and this machine will then require an input of 400 watts. During the regulation of the battery discharge the exciting circuit 62, 30, 70, 56 of the booster 30 will require about 42 watts and its teaser circuit 24 will consequently only require some 18 watts, making an output of 134 watts necessary from the discharge regulating dynamo 26. The corresponding input into the regulating dynamo 26 must be say 242 watts on the assumption of an efficiency of 55%. The motor 38 may have to drive 30 and 26 at full load for discharging purposes when its output must be 709 watts or 0.95 horse power or it may have to drive 10 at full load and 30 at full load when charging, and its output must then be 745 watts or 1 horse power. A one horse power motor will of course do the work easily, and this machine can be run at any desired speed. This example shows that the dynamo electric machines required in this system for regulating purposes are very small and always run under very favorable electrical conditions. Furthermore the voltages for which they must be designed are very low, so that these machines can very easily be made to run perfectly and to be quite free from breakdowns. No energy being wasted in resistances during the regulating process, the system is a highly efficient one. The regulation is very rapid because all intermediate electromagnetic and therefore sluggish devices are avoided and the exciting fluxes of the various dynamos are directly adjusted.

Having fully described my invention, what I claim as new and desire to secure by Letters Patent of the United States is:

1. In a system of electrical distribution, the combination of a consumption circuit, a storage battery and a main dynamo connected thereto, said main dynamo being provided with an exciting winding, an auxiliary dynamo adapted to generate a higher voltage than the main dynamo and connected in opposition to said main dynamo through said exciting winding, and means in circuit with the main dynamo for regulating the charging current of the storage battery.

2. In a system of electrical distribution, the combination of a consumption circuit, a storage battery, a main dynamo connected thereto and having an exciting circuit, an auxiliary dynamo connected in said exciting circuit of the main dynamo, said auxiliary dynamo being adapted to generate an E. M. F. in excess of and opposing the E. M. F. generated by said main dynamo, means for varying the E. M. F. generated by the auxiliary dynamo, and means in circuit with the main dynamo for regulating the charging current of the storage battery.

3. In a system of electrical distribution, the combination of a consumption circuit, a storage battery connected thereto, a main dynamo connected in said exciting circuit and for supplying current to the consumption circuit, an auxiliary dynamo adapted to generate an E. M. F. in excess of, and opposing the E. M. F. generated by the main dynamo, a motor connected to the consumption circuit and driving the auxiliary dynamo, and means in circuit with the main dynamo for regulating the charging current of the storage battery.

4. In a system of electrical distribution, the combination of a consumption circuit, a storage battery and a main dynamo connected thereto and having an exciting circuit, an auxiliary dynamo connected in said exciting circuit of the main dynamo, said auxiliary dynamo being adapted to generate an E. M. F. in excess of and opposing the E. M. F. generated by said main dynamo, a motor connected to the consumption circuit and driving the auxiliary dynamo, means for varying the speed of said motor, and means in circuit with the main dynamo for regulating the charging current of the storage battery.

5. In a system of electrical distribution, the combination of a consumption circuit, a storage battery connected thereto, a main dynamo having an exciting circuit and an auxiliary dynamo connected in said exciting circuit, said auxiliary dynamo being adapted to generate an E. M. F. in excess of and opposing the E. M. F. generated by said main dynamo, means for connecting the main dynamo to the consumption circuit and a booster in circuit between said main dynamo and the storage battery.

6. In a system of electrical distribution, the combination of a consumption circuit, a storage battery connected thereto, a main dynamo provided with a primary exciting winding, an auxiliary dynamo connected in local circuit with said main dynamo through the said exciting winding, said auxiliary dynamo being adapted to generate an E. M. F. in excess of and opposing the E. M. F. generated by said main dynamo, means for connecting the main dynamo to the consumption circuit, and a booster in circuit between said dynamo and the storage battery.

7. In a system of electrical distribution, the combination of a consumption circuit, a storage battery connected thereto, a main dynamo provided with a primary exciting winding, an auxiliary dynamo connected in local circuit with said main dynamo through the said exciting winding, said auxiliary dynamo being adapted to generate an E. M. F. in excess of and opposing the E. M. F. generated by said main dynamo, means for connecting the main dynamo to the consumption circuit, a booster in circuit between said dynamo and the storage battery, and means for decreasing the voltage of said booster as the charging current increases.

8. In a system of electrical distribution, the combination of a consumption circuit, a storage battery connected thereto, a main dynamo and an auxiliary dynamo connected in local circuit, said auxiliary dynamo being adapted to generate an E. M. F. in excess of and opposing the E. M. F. generated by said main dynamo, means for connecting the main dynamo to the consumption circuit, a booster in circuit between said main dynamo and the storage battery, and means for regulating the magnitude and direction of the E. M. F. generated by the booster.

9. In a system of electrical distribution, the combination of a consumption circuit, a storage battery connected thereto, a main dynamo and an auxiliary dynamo connected in local circuit, means for connecting the main dynamo to the consumption circuit, a booster in circuit between said main dynamo and the storage battery and provided with a discharge regulating winding, a source of independent E. M. F. so connected in local circuit with said storage battery through said discharge regulating winding that the independent E. M. F. opposes the E. M. F. produced by the storage battery.

10. In a system of electrical distribution, the combination of a consumption circuit, a storage battery connected thereto, a main dynamo and an auxiliary dynamo connected in local circuit, means for connecting the main dynamo to the consumption circuit, a booster in circuit between said main dynamo and the storage battery and provided with a discharge regulating winding, a discharge regulating dynamo connected in local circuit with said storage battery through said discharge regulating winding, and adapted to generate an E. M. F. opposing that produced by the storage battery.

11. In a system of electrical distribution, the combination of a consumption circuit, a storage battery connected thereto, a main dynamo and an auxiliary dynamo connected in local circuit, said auxiliary dynamo being adapted to generate an E. M. F. in excess of and opposing the E. M. F. generated by said main dynamo, means for connecting the main dynamo to the consumption circuit, a booster in circuit between said main dynamo and the storage battery and provided with a discharge regulating winding, a source of independent E. M. F. so connected in local circuit with said storage battery through said discharge regulating winding that the independent E. M. F. opposes the E. M. F. produced by the storage battery, means for interrupting the circuit of the discharge regulating winding when charging the battery and means for decreasing the voltage impressed on the storage battery as the charging current increases.

12. In a system of electrical distribution, the combination with a consumption circuit of a storage battery, a main dynamo provided with an exciting winding, working brushes connected to the consumption circuit and exciting brushes, an auxiliary regulating dynamo in circuit with the exciting winding and adapted to generate an E. M. F. in excess of and arranged to oppose the E. M. F. generated by the main dynamo, a motor for driving said auxiliary dynamo and means in circuit with the main dynamo for regulating the charging current of the storage battery.

13. In a system of electrical distribution, the combination with a consumption circuit, of a main dynamo adapted to be connected thereto, an auxiliary regulating dynamo, a storage battery, a booster included in the circuit between the main dynamo and the storage battery, and having a discharge regulating winding and a charge regulating winding, a discharge regulating dynamo, means for driving the auxiliary dynamo, the booster and the discharge regulating dynamo, means for connecting said discharge regulating winding in circuit with the storage battery and the discharge regulating dynamo when discharging the storage battery, and means for rendering said charge regulating winding inoperative when discharging the battery.

14. In a system of electrical distribution, the combination with a consumption circuit, of a main dynamo, an auxiliary regulating dynamo, a storage battery, a booster included in the circuit between the main dynamo and the storage battery and having a discharge regulating winding and a charge regulating winding, a discharge regulating dynamo, means for driving the auxiliary dynamo, the booster and the discharge regulating dynamo, and automatic means for progressively changing the connections between elements of the system as the speed varies.

15. In a system of electrical distribution, the combination with a consumption circuit, of a main dynamo adapted to be connected in parallel thereto, an auxiliary regulating dynamo, a storage battery, a booster included in the circuit between the main dynamo and the storage battery and having a discharge regulating winding and a charge regulating winding, a discharge regulating dynamo and means for driving the auxiliary dynamo, the booster and the discharge regulating dynamo.

In witness whereof I have hereunto set my hand and affixed my seal in the presence of the two subscribing witnesses.

VALÈRE ALFRED FYNN. [L. S.]

Witnesses:
  E. E. HUFFMAN,
  M. ARNOLD.